(12) United States Patent
Steinberger

(10) Patent No.: US 9,247,115 B2
(45) Date of Patent: Jan. 26, 2016

(54) IMAGER MODULE FOR A CAMERA, CAMERA AND METHOD FOR MANUFACTURING THE IMAGER MODULE

(71) Applicant: Robert Bosch GmbH, Stuttgart (DE)

(72) Inventor: Werner Steinberger, Immenstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/318,340

(22) Filed: Jun. 27, 2014

(65) Prior Publication Data

US 2015/0002737 A1 Jan. 1, 2015

(30) Foreign Application Priority Data

Jun. 28, 2013 (DE) .......................... 10 2013 212 748

(51) Int. Cl.
*H04N 5/225* (2006.01)

(52) U.S. Cl.
CPC ............ *H04N 5/2253* (2013.01); *H04N 5/2252* (2013.01); *H04N 5/2254* (2013.01); *H04N 5/2257* (2013.01); *Y10T 29/49004* (2015.01)

(58) Field of Classification Search
CPC . H04N 5/2252; H04N 5/2253; H04N 5/2254; H04N 5/2257

USPC .......... 348/373, 374; 359/819, 822, 826, 827, 359/643

See application file for complete search history.

(56) References Cited

U.S. PATENT DOCUMENTS

| | | | | |
|---|---|---|---|---|
| 5,973,861 | A * | 10/1999 | Dross .......................... | F41G 1/38 359/819 |
| 6,122,115 | A * | 9/2000 | Plummer et al. ............... | 359/822 |
| 7,643,232 | B2 * | 1/2010 | Su ............................ | G02B 7/023 359/814 |
| 2006/0291068 | A1 * | 12/2006 | Dahmen et al. ................ | 359/643 |
| 2012/0169907 | A1 * | 7/2012 | Lee ............................... | 348/294 |

* cited by examiner

*Primary Examiner* — Sinh Tran
*Assistant Examiner* — Zhenzhen Wu
(74) *Attorney, Agent, or Firm* — Kenyon & Kenyon LLP

(57) ABSTRACT

An imager module for a camera includes: at least one objective holder; an image sensor mounted on the objective holder; and an objective accommodated in a tube area of the objective holder. Multiple contact areas are formed between an outer surface of the objective and the cylindrical inner surface of the tube area of the objective holder by frictional engagement. For this purpose, a first clamping plane is formed in the tube area, and a second clamping plane is formed which is offset from the first clamping plane along a longitudinal axis of the tube area, multiple first contact areas being formed in the first clamping plane, and multiple second contact areas being formed in the second clamping plane and situated distributed around the longitudinal axis in a circumferential direction.

11 Claims, 5 Drawing Sheets

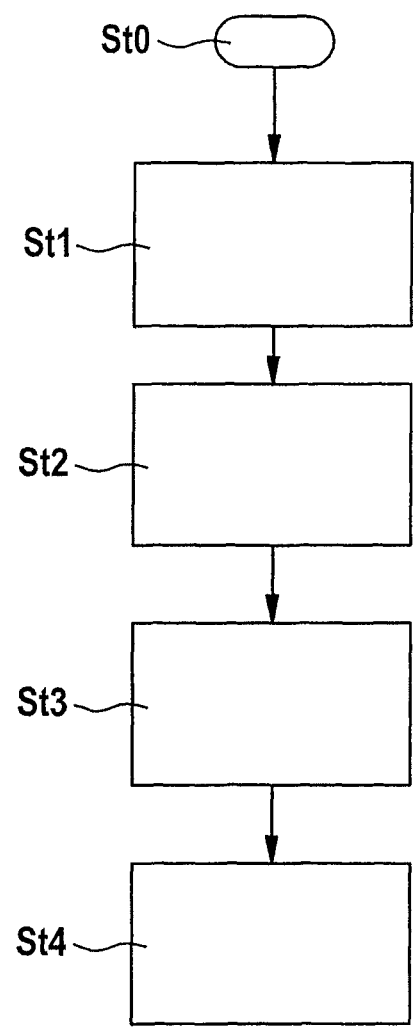

IMAGER MODULE FOR A CAMERA, CAMERA AND METHOD FOR MANUFACTURING THE IMAGER MODULE

BACKGROUND OF THE INVENTION

1. Field of the Invention

The present invention relates to an imager module for a camera, to a camera including such an imager module, and to a method for manufacturing the imager module.

2. Description of the Related Art

Such imager modules are used in particular in cameras for vehicles which are attached in the interior area of the vehicle and, for example, detect an exterior area outside the vehicle through a pane or also the interior area of the vehicle. The imager module is accommodated and contacted in a camera housing and may represent a finished, focused unit.

The imager module generally includes an objective holder, which may have a one-piece or also a multi-piece design and generally includes a tube area or a tubular area into which the objective is inserted in the longitudinal direction. The objective holder may have a multi-piece design and include a sensor carrier to which the tubular objective holder is attached; moreover, systems having a single-piece objective holder are also known, which thus has a carrier area for accommodating an image sensor and the tube area. The image sensor is mounted and contacted on the objective holder and together with the inserted objective defines the optical axis of the imager module. Image signals of the image sensor are read out by a control unit which is mounted on a circuit carrier board accommodated in the camera housing, for example.

The optical properties of the camera, i.e., in particular the focusing or focal length and possible malpositions, are thus established by inserting and mounting the objective in the objective holder.

In camera systems having fixed focusing (fixed-focus cameras), the objective is accommodated in the objective holder, focused once along the axis of symmetry of the tube area and then permanently fixed, for example with the aid of a bonded joint or an adhesive bond. The rear lens space between the last lens and the image sensor should preferably be free from disruptive particles. The positioning of the objective in the objective holder, and thus with respect to the image sensor, should have a preferably precise position in the longitudinal direction of the axis of symmetry of the tube area and in the clamping plane perpendicular thereto, and moreover should have a very precise orientation in the three spatial angles. Very precise focusing and positioning are required in particular for stereo camera systems for measuring distances.

For this purpose, generally different types of fixation with the aid of adhesive or frictional engagement are known. On the one hand, there are press fit joints, e.g., with the aid of press ribs extending in the longitudinal direction on the outer side of the objective and suitable mating surfaces in the objective holder. During insertion of the objective, the objective is thus pressed with its outer side and the press ribs formed on the outer side against the inner surface of the objective holder, whereupon a fixating glued joint may be created by introducing an adhesive. The orientation thus already takes place when the objective is pressed into the objective holder.

The disadvantage of such systems is that, in the case of the press fit joint, particles may be abraded from the press ribs, which may then fall into the rear lens space in a disruptive manner and end up on the image sensor, whereby the image quality may be considerably impaired. In particular, focusing by sliding the objective back and forth in the objective holder results in great particle abrasion. Moreover, depending on the tolerance situation, the press fit in part introduces great forces into the objective and the tube area of the objective holder.

Further known embodiments provide for a fixation of the objective in the objective holder with the aid of a clamping action between the inner surface of the objective holder and the outer surface of the objective by ascending or descending surfaces in the circumferential direction, e.g., as a wedge action. However, the disadvantage of such systems is that the two joining partners generally have complex surfaces; however, real surfaces generally deviate from the theoretical shape, so that the points of contact are often random, which may cause a negative impact on the precise position of the optical axis and the orientation in three spatial angles, i.e., a tilt of the optical axis of the objective with respect to the axis of the symmetry of the tube area.

BRIEF SUMMARY OF THE INVENTION

The objective is accommodated in the objective holder with the aid of a clamping action or a frictional engagement, which is formed in two clamping planes spaced apart from each other along the longitudinal axis (axis of symmetry) of the tube area. In this way a first clamping plane having a frictional engagement between the outer surface of the objective and the inner surface of the objective holder is provided, and a second clamping plane is provided which is offset therefrom along the axis of symmetry of the objective holder.

If the objective is properly oriented in the tube area of the objective holder, the optical axis corresponds to the axis of symmetry of the objective holder, and thus also to the axis of symmetry of the objective.

Preferably an area in which no clamping action and no frictional engagement takes place is provided between the two clamping planes of the frictional engagement. As a result, what is present is not a continuous, longer clamping area in the axial direction, but two clamping planes which are spaced apart.

The frictional engagement takes place in each clamping plane at multiple contact areas or points which are spaced apart in the circumferential direction, in particular at three punctiform contact areas.

This already achieves the advantage that each clamping plane is clearly established by the three points and also is not overdefined; it is thus achieved that a defined contact at each of the three contact points exists in each clamping plane.

According to one particularly preferred embodiment, on one of the two contact surfaces—i.e., the outer surface of the objective or the inner surface of the tube area—contact elevations are formed, i.e., in particular small-area contact elevations on an otherwise, e.g., cylindrical circumference. Wedge areas are provided on the other contact surface, which thus have a monotonic change of the radius in a circumferential direction, so that clamping takes place during a relative rotation.

In this way, three contact elevations, e.g., lens-shaped contact elevations or other elevations having flatly extending tips, may be formed in particular on the outer surface of the objective in each of the two clamping planes, and wedge surfaces tapering radially inwardly in the circumferential direction may be formed on the inner surface of the objective holder. Generally, the corresponding reciprocal design is also possible, i.e., inwardly protruding contact elevations on the inner surface of the tube area and corresponding wedge surfaces on the outer surface of the objective, which increase radially outwardly in the circumferential direction.

Instead of the lens shape, the contact elevations may also be designed as cylinder pieces or cones, for example. The formation of a flat tip allows the advantage of low abrasion during rotation for fixation.

In this way, the advantage is achieved that only one of the two joining partners has a more complex surface, e.g., in the form of a logarithmic spiral. Even if errors exist in the shaping of this more complex surface, a defined contact still exists since the counter surface allows a defined contact due to the simpler design, e.g., very easily definable lens-shaped elevations.

Such embodiments also have the advantage of self-centering in each of the clamping planes.

The objective is thus inserted in the axial direction or longitudinal direction; for this purpose, the advantage is achieved that the wedge areas include points having sufficient clearance, so that the objective may be inserted without frictional action, if necessary also entirely without contact, in the longitudinal direction. Focusing by back and forth movement of the objective along the axial direction or longitudinal direction is thus also possible, so that, contrary to conventional systems having a press fit joint, a precise determination of the focal position by back and forth movement is made possible.

After the precise focal position has been ascertained, the fixation by rotation of the objective in the objective holder may take place, self-centering taking place in each clamping plane, and the clamping action in the two clamping planes resulting in great stability, namely a stabilization in two parallel clamping planes, in particular according to the principle of a tripod.

Finally, final fixation and sealing may take place by introducing an adhesive material, in particular into the free area between the clamping planes, moreover also in the clamping planes between the contact areas.

The two contact partners, i.e., both the contact elevations and the wedge areas, are symmetrically provided, i.e., in particular at 120° angle intervals. They are provided in particular also in identical angular positions or azimuth angle position, i.e., behind each other in the longitudinal direction. This also allows the advantage of the contact-free or low-friction insertion of the objective into the objective holder in defined positions, in which also the rear contact elevations are guided by the first clamping plane having the first wedge areas of the tube area, without abrasion occurring, and subsequently the first and second clamping planes are defined in each case by their contact partners.

The directional indication "front" and "rear" refers to the orientation of the objective, i.e., the objective is open toward the front for detecting a detection area.

According to the present invention, several advantages are thus achieved:

A simple design is possible. It is possible to create the contact areas for forming the frictional engagement without major shape complexity, in particular also without additional components or subsequent manufacturing steps, by appropriately shaping the outer surface of the objective and the inner surface of the tube area.

By only one of the contact partners having a more complex surface, the manufacturing inaccuracies are low and may be minimized by suitably shaping the contact elevations and the self-centering action in each clamping plane.

The objective may be axially joined without contact, in particular also with play; precise focusing by back and forth movement is possible.

The subsequent joining by rotation of the objective in the objective holder initially takes place with play until the frictional engagement takes hold. In this way no undesirable particles are generated.

The objective may be rotated in the ascertained focal position all the way to self-locking. The resulting forces at the six punctiform contact areas or support points are not dependent on the dimensional tolerances, but on the selected tightening torque, i.e., the torque when screwing the objective into the objective holder.

The formation of flat tips of the contact elevation allows great particle avoidance.

No large surface overlaps as in more complex shaft-hub connections are required since according to the present invention no relevant torques are to be transmitted.

Due to the self-centering in two clamping planes which are spaced apart from each other, a very precise orientation in the position and spatial angles is achieved.

A secure connection and good sealing are achieved by the subsequent bonding.

BRIEF DESCRIPTION OF THE DRAWINGS

FIG. 8 shows a flow chart of a manufacturing method according to the present invention.

DETAILED DESCRIPTION OF THE INVENTION

Figure 1:
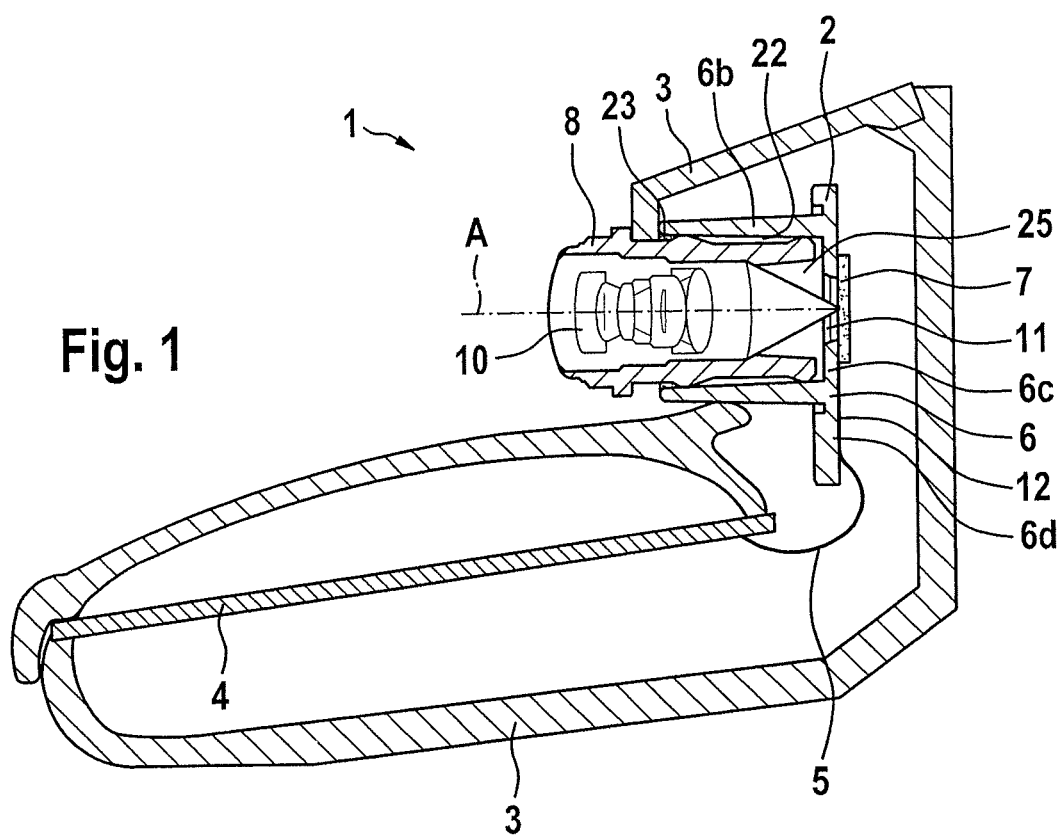
FIG. 1 shows a camera according to one specific embodiment including an imager module according to one specific embodiment in a section along the optical axis.
Figure 2:
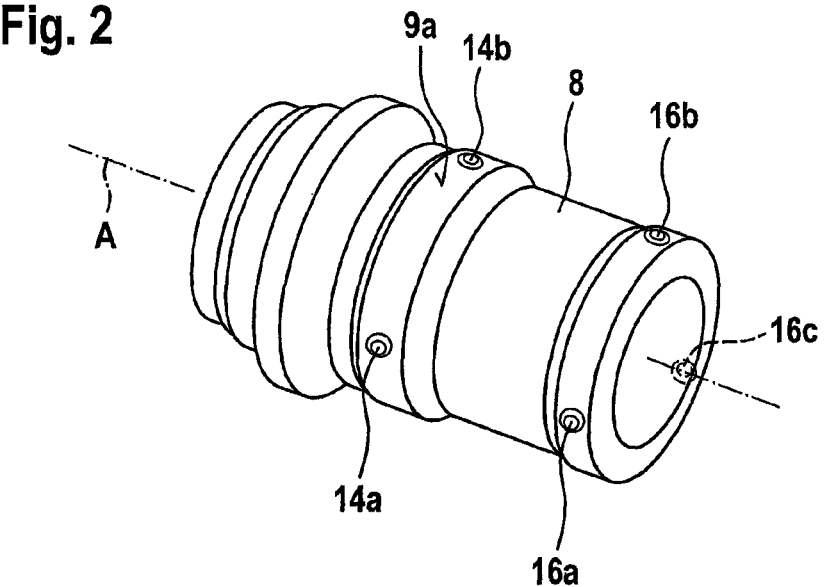
FIG. 2 shows the objective from FIG. 1 in a perspective view.

A camera 1 is provided for attachment in a vehicle, e.g., on the interior side of a windshield of the vehicle, and includes an imager module 2 which is shown in greater detail in the following figures. Camera 1 further includes an, e.g., two-piece camera housing 3 and a circuit carrier board 4, e.g., a printed circuit board 4, including electronic components which are not shown in detail here, such as a control unit and a data interface. Imager module 2 is contacted with circuit carrier board 4 via a connection, e.g., wire bonds 5 or a flexible line.

Imager module 2 forms a self-contained unit, which is subsequently accommodated in camera housing 3, and includes an objective holder 6, an image sensor 7 and an objective 8 accommodated in objective holder 6. Objective 8, in turn, includes a lens mount 9 and multiple lenses 10 accommodated in lens mount 9. Image sensor 7 and objective 8 define an optical axis A.

Objective holder 6 includes a tube area 6b having a cylindrical inner surface 6a and moreover a sensor carrier area 6c and a conducting area 6d; image sensor 7 is mounted here on carrier area 6c using flip chip technology and is contacted with printed conductors 12, which run from carrier area 6c to conducting area 6d and are contacted there with wire bonds 5 or a flexible line. A recess 11 is formed in carrier area 6c in front of image sensor 7. However, other installations of image sensor 7 are also generally possible, e.g., on the front side of carrier area 6c.

Objective holder 6 defines a Cartesian coordinate system XYZ, Z representing the longitudinal axis and thus an axis of symmetry of tube area 6b, and XY representing the plane perpendicular to longitudinal axis Z, i.e., the plane of sensor carrier area 6c and of conducting area 6d in which printed conductors 12 are also situated. When properly adjusted, optical axis A is thus situated in longitudinal axis Z (axis of symmetry) of objective holder 6.

Lens mount 9 has an outer surface 9a and an inner surface 9b, which accommodates lenses 10 and, if necessary, spacers between lenses 10. To create imager module 2, image sensor 7 is thus mounted from the rear onto carrier area 6c of objective holder 6 and is contacted, e.g., soldered or attached with the aid of conductive adhesive, and finished objective 8 is inserted from the front—i.e., from the left in FIG. 4—into tube area 6b. Imager module 2 is generally focused by detecting a test pattern and evaluating the image signals of image sensor 7, while longitudinally adjusting objective 8 in tube area 6b in the direction of longitudinal axis Z.

A frictional engagement is formed between outer surface 9a of lens mount 9 and inner surface 6a of objective holder 6.

The frictional engagement takes place in two clamping planes E1 and E2 which represent XY planes in different positions of longitudinal axis Z, i.e., are situated perpendicularly on longitudinal axis Z, and thus ideally also perpendicularly on optical axis A, and are spaced apart from each other in the Z direction. An area 24 between clamping planes E1 and E2 has no clamping action, so that in fact two clamping planes E1 and E2 are present, and not one longer clamping area.

Advantageously, clamping planes E1 and E2 are essentially provided in a front area and a rear area of tube area 6b, whereby great stability is achieved. First contact elevations (contact protrusions) 14a, 14b, 14c are formed distributed on outer surface 9a of lens mount 9, and thus of objective 8, in each case in the circumferential direction P in clamping planes E1 and E2, and second contact elevations 16a, 16b, 16c are formed accordingly in clamping plane E2. Contact elevations 14a, 14b, 14c and 16a, 16b, 16c are situated symmetrically in the circumferential direction, i.e., at 120° angular distance around the longitudinal axis of lens mount 9, and thus of objective 8, which in the ideal case represents optical axis A, advantageously also in identical angular positions, so that in each case a first contact elevation 14a and a second contact elevation 16a are situated behind each other in the longitudinal direction of objective 8 (which in the ideal case corresponds to the Z direction of tube area 6b). The radius or distance of first and second contact elevations 14a, 14b, 14c, 16a, 16b, 16c from the axis of symmetry of lens mount 9 is advantageously the same.

Figure 3:
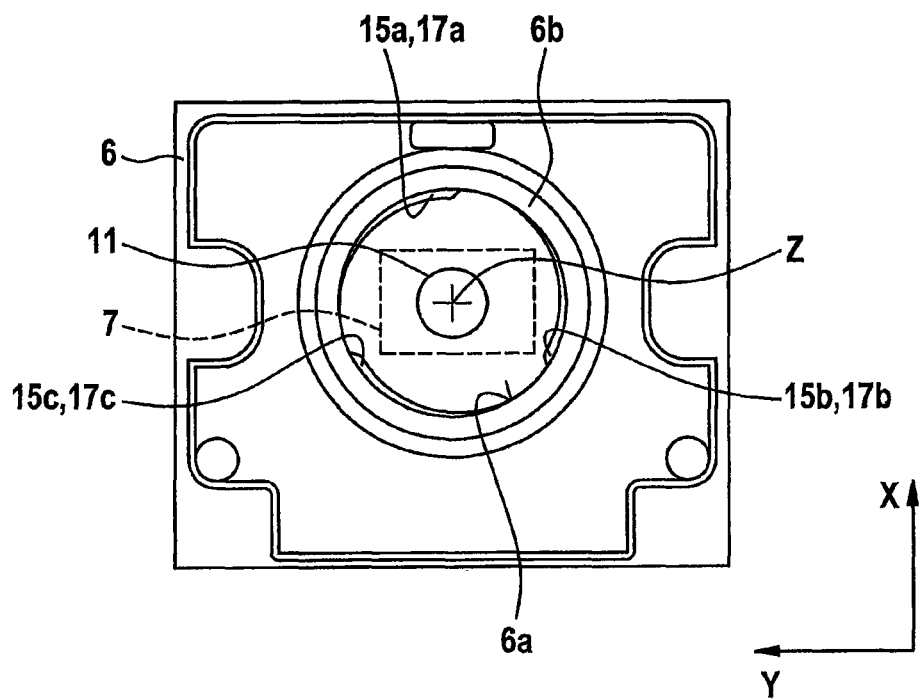
FIG. 3 shows a front view of the objective holder.

Accordingly, first wedge areas 15a, 15b, 15c are formed on the cylindrical inner surface 6a in first clamping plane E1, and second wedge areas 17a, 17b, 17c are formed in second clamping plane E2, having the same axial distance and the same angular interval as contact elevations 14a, 14b, 14c and 16a, 16b, 16c. Wedge areas 15a, 15b, 15c and 17a, 17b, 17c extend inwardly in the circumferential direction with a continuous slope, i.e., the radius is monotonically decreasing in the wedge areas in the circumferential direction; thus, they narrow in the circumferential direction and approach longitudinal axis Z. Wedge areas 15a, 15b, 15c and 17a, 17b, 17c may in particular be designed in the form of a logarithmic spiral. In the front view of FIG. 3, wedge areas 15a, 15b, 15c and 17a, 17b, 17c are shown situated on top of each other.

Wedge areas 15a, 15b, 15c and 17a, 17b and 17c may in each case have a slightly larger axial length than contact elevations 14a, 14b, 14c and 16a, 16b, 16c, so that an engagement in different longitudinal positions of objective 8 in objective holder 6, i.e., at different focusing settings, exists. Contact elevations 14a, 14b, 14c and 16a, 16b, 16c advantageously extend outwardly with a flat tip, so that they are in engagement in each case with opposing wedge areas 15a, 15b, 15c and 17a, 17b, 17c at punctiform contact areas 18a, 18b, 18c in first clamping plane E1 and at punctiform contact areas 20a, 20b, 20c in second clamping plane E2.

Thus, an engagement at three points which are positioned distributed in the circumferential direction exists in each of the two clamping planes E1 and E2; the engagement in each clamping plane E1 and E2 is thus clear since three points define one clamping plane. Due to the contact engagement in two clamping planes, great stability is achieved, in particular similar to a tripod.

Advantageously, an adhesive material 23 is additionally introduced into radial gap 22 between outer surface 9a of objective 8 and (cylindrical) inner surface 6a of objective holder 6, e.g., in front of first clamping plane E1, which thus completely seals radial gap 22 in the circumferential direction and ensures final fixation by an adhesive bond.

A rear lens space 25 between lens 10 furthest to the rear and image sensor 7 is thus hermetically sealed.

Contact elevations 14a, 14b, 14c and 16a, 16b, 16c may in particular be lens-shaped, i.e., extend flat toward the tip, so that they do not produce any or no relevant abrasion in the engagement with wedge areas 15a, 15b, 15c and 17a, 17b, 17c since contact areas 18a, 18b, 18c and 20a, 20b, 20c are practically punctiform. Contact elevations 14a, 14b, 14c and 16a, 16b, 16c may be formed directly during the shaping of lens mount 9 on outer surface 9a; accordingly, wedge areas 15a, 15b, 15c and 17a, 17b, 17c are also formed directly on (cylindrical) inner surface 6a of objective holder 6.

Imager module 2 is thus manufactured according to FIG. 8 in the following steps:

After the start in St0, in step St1 objective holder 6 and objective 8 are provided or manufactured; for example, objective holder 6 may be manufactured as an injection-molded circuit carrier or molded interconnect device using an MID method while simultaneously forming printed conductor 12; the shown cup shape is particularly suited for such a manufacturing method. Objective 8 may be created in the customary manner by manufacturing lens mount 9, e.g., as an injection-molded part or by another method, and subsequently introducing lenses 10 into lens mount 9, if necessary by interposing spacers between them. In the manufacture of lens mount 9, contact elevations 14a, 14b, 14c and 16a, 16b, 16c are already formed as lens-shaped protrusions on outer surface 9a; accordingly, wedge areas 15a, 15b, 15c and 17a, 17b, 17c are also already formed in (cylindrical) inner surface 6a of objective holder 6. Moreover, in step St1 image sensor 7 is also already mounted on carrier area 6c of objective holder 6 and contacted, so that its sensitive surface is situated forwardly in front of recess 11.

Figure 4:
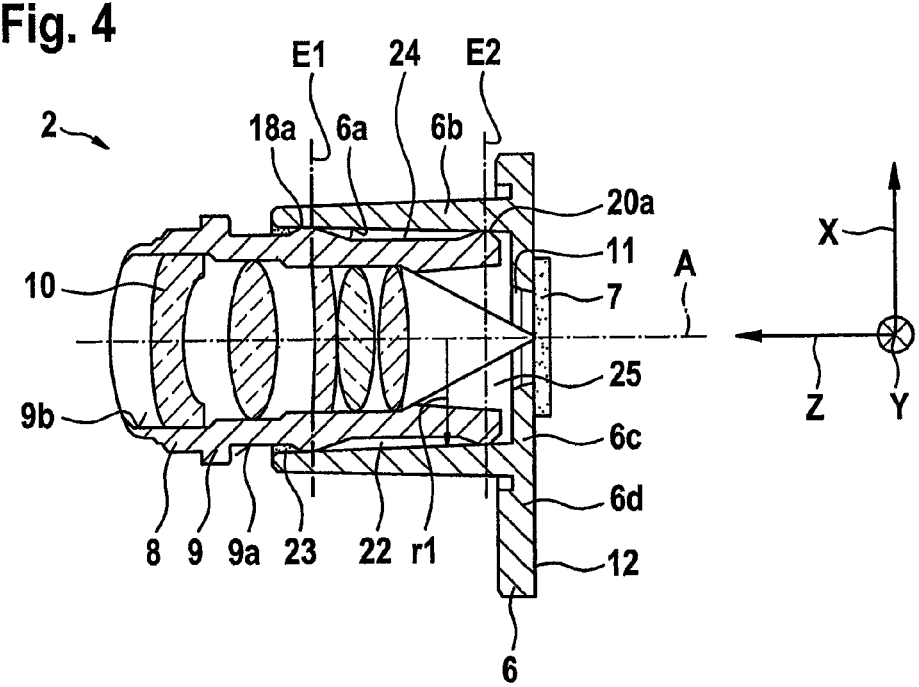
FIG. 4 shows a schematized detail enlargement from FIG. 1 with the essential components of the imager module.
Figure 5:
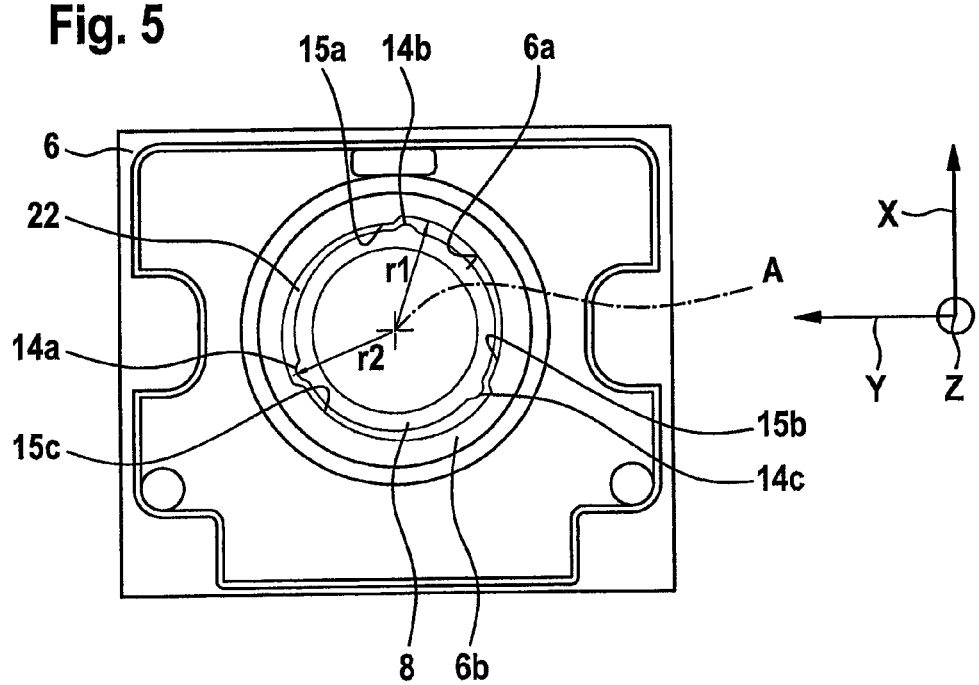
FIG. 5 shows a section perpendicular to the optical axis of the imager module prior to fixation.

In step St2, finished objective 8 is subsequently pushed from the front—thus from the left in FIG. 4—into tube area 6b of objective holder 6 in the direction of longitudinal axis Z. An angular position according to FIG. 5 is selected for this purpose, in which contact elevations 14a, 14b, 14c—accordingly also second contact elevations 16a, 16b, 16c not shown in the sectional view of FIG. 5—reach areas having a large radius of inner surface 6a in the azimuth angle direction or circumferential direction, i.e., outside of wedge areas 15a, 15b, 15c and 17a, 17b, 17c. In this position of FIG. 5, thus an inside diameter r1 of tube area 6b is greater than an outside diameter r2 of contact elevations 14a, 14b, 14c, i.e., r1>r2. The axial insertion of objective 8 into tube area 6b thus takes place without abrasion, advantageously even without contact. As part of step St2, or also as a subsequent step, the focusing takes place by image sensor 7 detecting a test pattern in different positions along longitudinal axis Z and by evaluating image signals of image sensor 7, so that the optimal longitudinal position in the Z direction is ascertained and thus the focusing of imager module 2 is achieved. Since no abrasion exists, objective 8 may be guided back and forth during focusing, i.e., forward and back along longitudinal axis Z.

Figure 6:
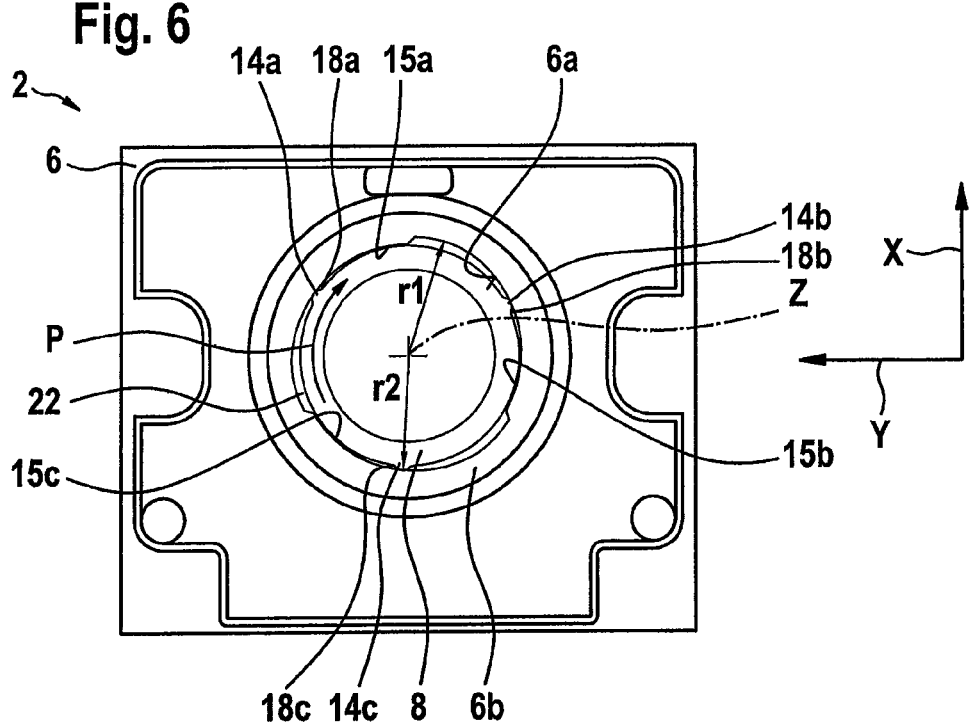
FIG. 6 shows the step of fixation following FIG. 5 by relative rotation of the objective in the objective holder.
Figure 7:
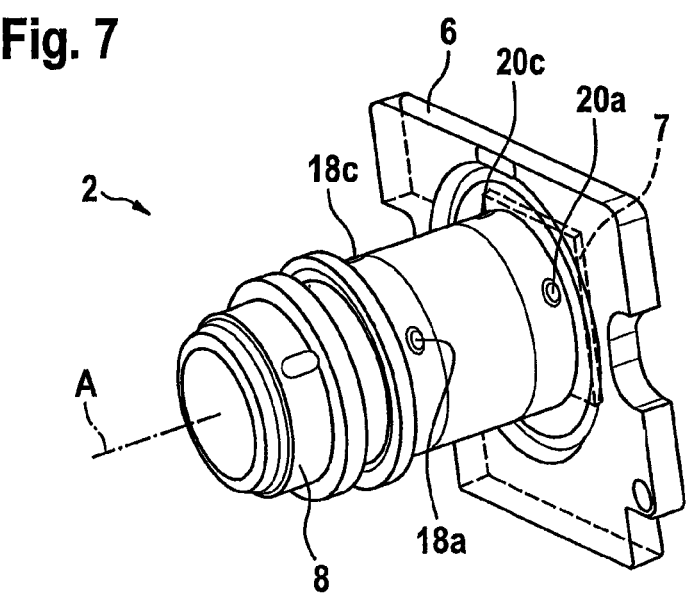
FIG. 7 shows a perspective view in a partial phantom view of the imager module.

Subsequently, a fixation in the focal position thus ascertained takes place according to step St3 by the relative rotation, i.e., a rotation of objective 8 in tube area 6b in the direction of the arrow, i.e., in circumferential direction P according to FIG. 6, forming a frictional engagement or a clamping action, so that punctiform contact areas 18a, 18b, 18c are formed in first clamping plane E1 and punctiform contact areas 20a, 20b, 20c are formed in second clamping plane E2. Contrary to the formation of threads, for example, this relative rotation takes place without a change of the longitudinal position, i.e., with a fixed Z value.

According to step St4, adhesive material 23 is subsequently introduced into radial gap 22 and thus final fixation and sealing of rear lens space 25 are ensured.

What is claimed is:

1. An imager module for a camera, comprising:
an objective holder having a tube area;
an image sensor mounted on the objective holder; and
an objective accommodated in the tube area of the objective holder;
wherein multiple contact areas are formed between an outer surface of the objective and the inner surface of the tube area of the objective holder by frictional engagement, wherein a first clamping plane is formed in the tube area, and wherein a second clamping plane is formed which is offset from the first clamping plane along a longitudinal axis of the tube area, and wherein the multiple contact areas include (i) multiple first contact areas formed in the first clamping plane, and (ii) multiple second contact areas formed in the second clamping plane and distributed around the longitudinal axis in a circumferential direction, and wherein in each of the first and second clamping planes, one of the inner surface of the tube area or the outer surface of the objective has radially protruding contact elevations, and the other one of inner surface of the tube area or the outer surface of the objective has wedge areas whose radius changes in the circumferential direction, for forming the frictional engagement during a relative rotation of the objective in the tube area.

2. The imager module as recited in claim 1, wherein three contact areas are formed distributed in the circumferential direction in each of the two clamping planes.

3. The imager module as recited in claim 2, wherein the multiple first and second contact areas are formed in the respective first and second clamping planes at the identical angular position, and each second contact area is situated behind a corresponding first contact area of the first clamping plane in the direction of the longitudinal axis.

4. The imager module as recited in claim 2, wherein a space which is free of contact areas is provided between the first and second clamping planes.

5. The imager module as recited in claim 1, wherein, in a starting angular position, the contact elevations are disengaged from the wedge areas for a contact-free insertion process, the inner surface of the tube area in the first and second clamping planes in the angular areas between the wedge areas having an inside radius which is greater than an outside radius of the contact elevations.

6. The imager module as recited in claim 1, wherein the wedge areas each have a monotonically changing radius in the circumferential direction, in the form of a logarithmic spiral.

7. The imager module as recited in claim 1, wherein the contact elevations are formed on the outer surface of the objective, and the wedge areas are formed on the inner surface of the tube area.

8. The imager module as recited in claim 7, wherein the contact elevations have one of a flat tip or a tip extending at a decreasing slope.

9. The imager module as recited in claim 7, wherein an adhesive material for at least one of sealing and integral fixation is introduced into a radial gap between the inner surface of the objective holder and the outer surface of the objective.

10. A camera, comprising:
a camera housing; and
an imager module at least partially provided in the camera housing, the imager module including:
an objective holder having a tube area;
an image sensor mounted on the objective holder; and
an objective accommodated in the tube area of the objective holder;
wherein multiple contact areas are formed between an outer surface of the objective and the inner surface of the tube area of the objective holder by frictional engagement, wherein a first clamping plane is formed in the tube area, and wherein a second clamping plane is formed which is offset from the first clamping plane along a longitudinal axis of the tube area, and wherein the multiple contact areas include (i) multiple first contact areas formed in the first clamping plane, and (ii) multiple second contact areas formed in the second clamping plane and distributed around the longitudinal axis in a circumferential direction, and wherein in each of the first and second clamping planes, one of the inner surface of the tube area or the outer surface of the objective has radially protruding contact elevations, and the other one of inner surface of the tube area or the outer surface of the objective has wedge areas whose radius changes in the circumferential direction, for forming the frictional engagement during a relative rotation of the objective in the tube area.

11. A method for manufacturing an imager module, comprising:
providing (i) an objective holder including a tube area having an inner surface, (ii) an image sensor mounted on the objective holder, and (iii) an objective having an outer surface;
inserting the objective into the tube area in the direction of a longitudinal axis of the tube area;
focusing by longitudinally adjusting the objective in the tube area while evaluating image signals of the image sensor for ascertaining a longitudinal position;
performing a relative rotation of the objective in the tube area to form frictionally engaged contact areas between the outer surface of the objective and the inner surface of the objective holder in two clamping planes which are spaced apart along the longitudinal axis of the tube area; and at least one of sealing and final fixing by introducing an adhesive material into a radial gap between the outer surface of the objective and the inner surface of the tube area;

wherein a first clamping plane is formed in the tube area, and wherein a second clamping plane is formed which is offset from the first clamping plane along a longitudinal axis of the tube area, and wherein the multiple contact areas include (i) multiple first contact areas formed in the first clamping plane, and (ii) multiple second contact areas formed in the second clamping plane and distributed around the longitudinal axis in a circumferential direction, and wherein in each of the first and second clamping planes, one of the inner surface of the tube area or the outer surface of the objective has radially protruding contact elevations, and the other one of inner surface of the tube area or the outer surface of the objective has wedge areas whose radius changes in the circumferential direction, for forming the frictional engagement during a relative rotation of the objective in the tube area.

* * * * *